United States Patent
Griffin

(10) Patent No.: US 9,122,009 B1
(45) Date of Patent: Sep. 1, 2015

(54) FIBER OPTIC TERMINATION

(71) Applicant: InnovaQuartz LLC, Pheonix, AZ (US)

(72) Inventor: Stephen E. Griffin, Peoria, AZ (US)

(73) Assignee: InnovaQuartz LLC, Phoenix, AZ (US)

(*) Notice: Subject to any disclaimer, the term of this patent is extended or adjusted under 35 U.S.C. 154(b) by 0 days.

(21) Appl. No.: 14/617,041

(22) Filed: Feb. 9, 2015

(51) Int. Cl.
| | |
|---|---|
| *G02B 6/25* | (2006.01) |
| *G02B 6/42* | (2006.01) |
| *G02B 6/38* | (2006.01) |
| *H01S 3/067* | (2006.01) |
| *G03B 37/00* | (2006.01) |
| *G02B 6/255* | (2006.01) |
| *C03B 37/15* | (2006.01) |

(52) U.S. Cl.
CPC .............. *G02B 6/2551* (2013.01); *C03B 37/15* (2013.01); *G02B 6/3813* (2013.01); *G02B 6/4296* (2013.01); *H01S 3/06733* (2013.01)

(58) Field of Classification Search
CPC .... G02B 6/3813; G02B 6/4296; C03B 37/15; H01S 3/06733
See application file for complete search history.

(56) References Cited

U.S. PATENT DOCUMENTS

| | | |
|---|---|---|
| 4,185,883 A | 1/1980 | Chown et al. |
| 5,179,610 A | 1/1993 | Milburn et al. |
| 6,282,349 B1 | 8/2001 | Griffin |
| 6,883,975 B2 | 4/2005 | Clarkin et al. |
| 6,948,862 B2 | 9/2005 | Brown |
| 7,204,645 B2 | 4/2007 | Brown |
| 7,309,167 B2 | 12/2007 | Stephen |
| 7,488,116 B2 | 2/2009 | Steve |
| 7,540,668 B2 | 6/2009 | Brown |
| 7,699,535 B2 | 4/2010 | Griffin |
| 7,839,901 B2 | 11/2010 | Meleshkevich et al. |
| 8,611,708 B2 | 12/2013 | Engelberth |

*Primary Examiner* — Jerry Rahll
(74) *Attorney, Agent, or Firm* — Synthesis Intellectual Property LLC

(57) ABSTRACT

Fiber optic terminations are disclosed for discriminating between potentially damaging energy and energy that has potential utility, internally conditioning and coupling only the energy that may safely be delivered by the optical fiber, particularly where the fiber traverses small radii and tortuous pathways, and harmlessly dissipating the potentially damaging energy within the fiber optic termination.

20 Claims, 11 Drawing Sheets

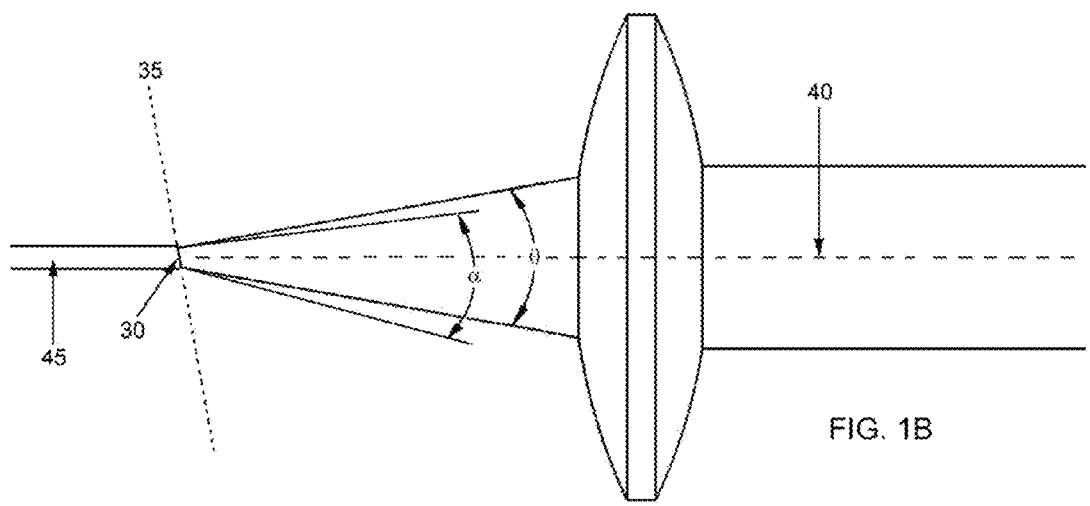
FIG. 1B
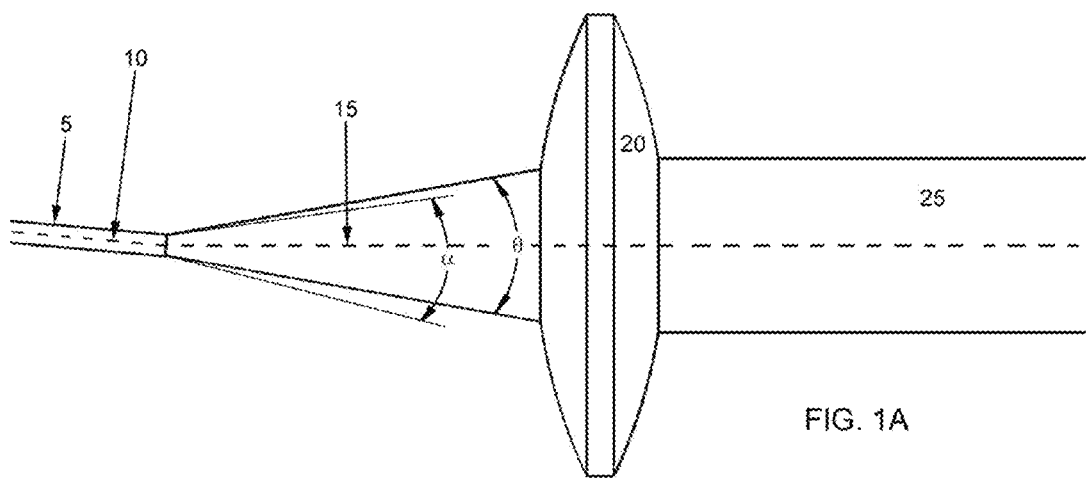
FIG. 1A
FIG. 1 (Prior Art)

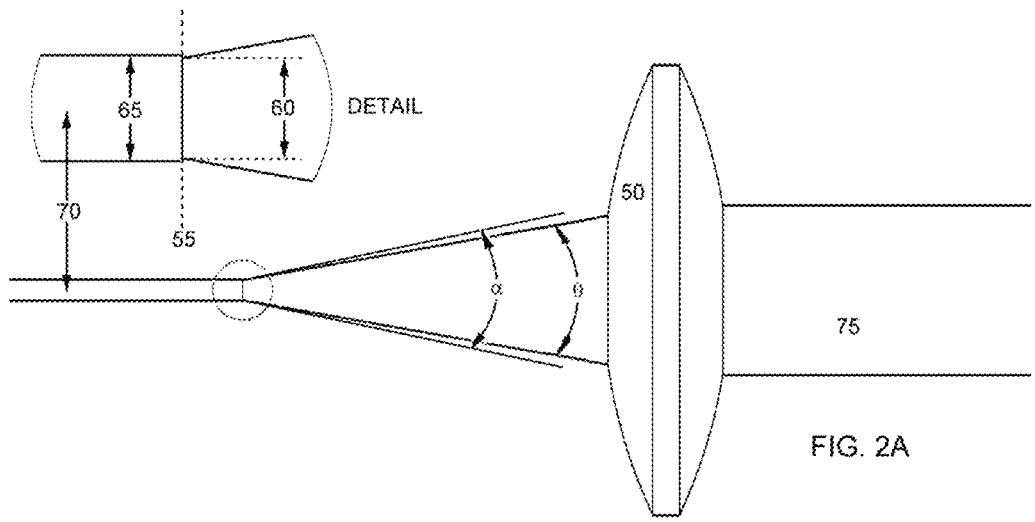
FIG. 2A
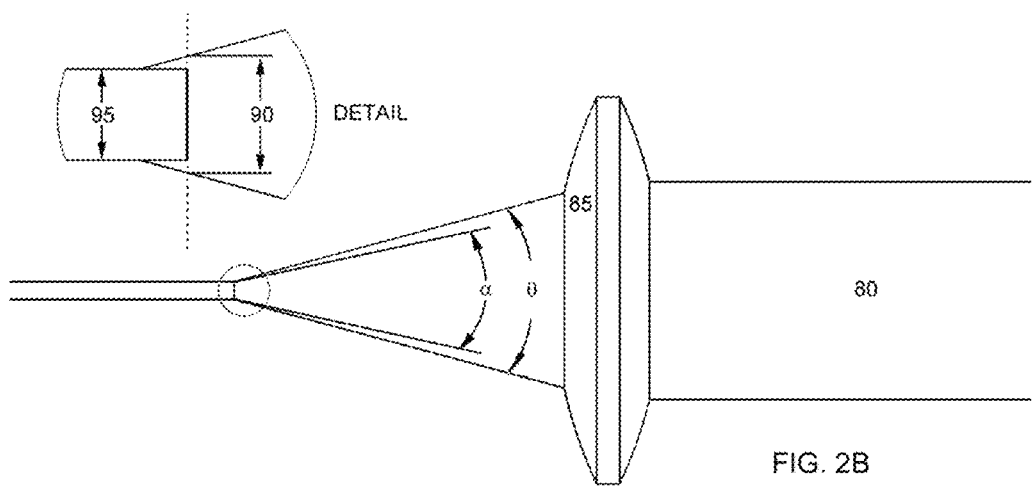
FIG. 2B
FIG. 2 (Prior Art)

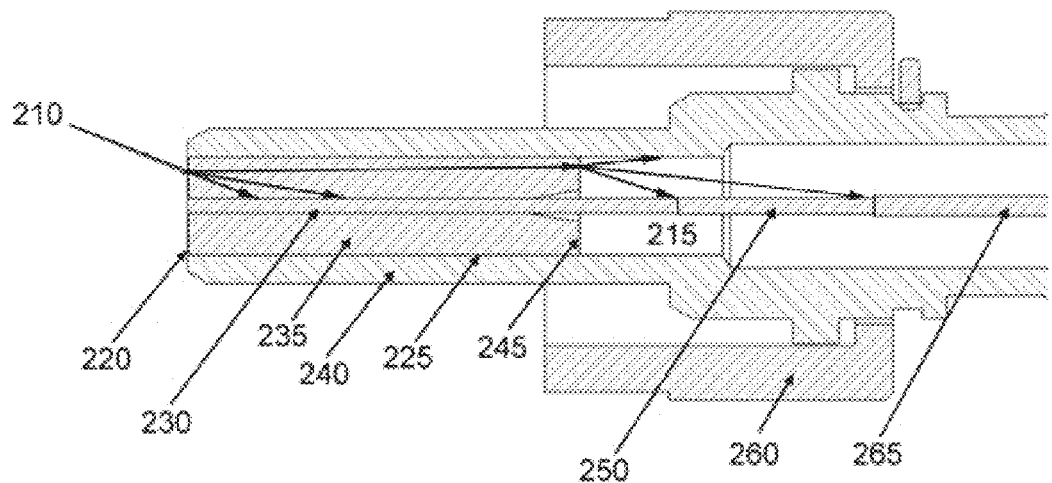
FIG. 5 (Prior Art '411)
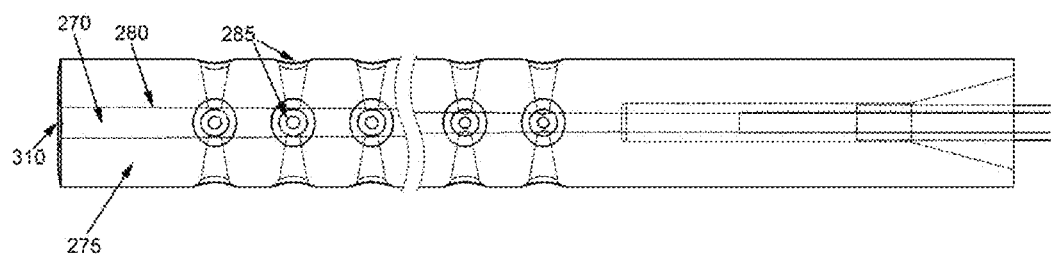
FIG. 6

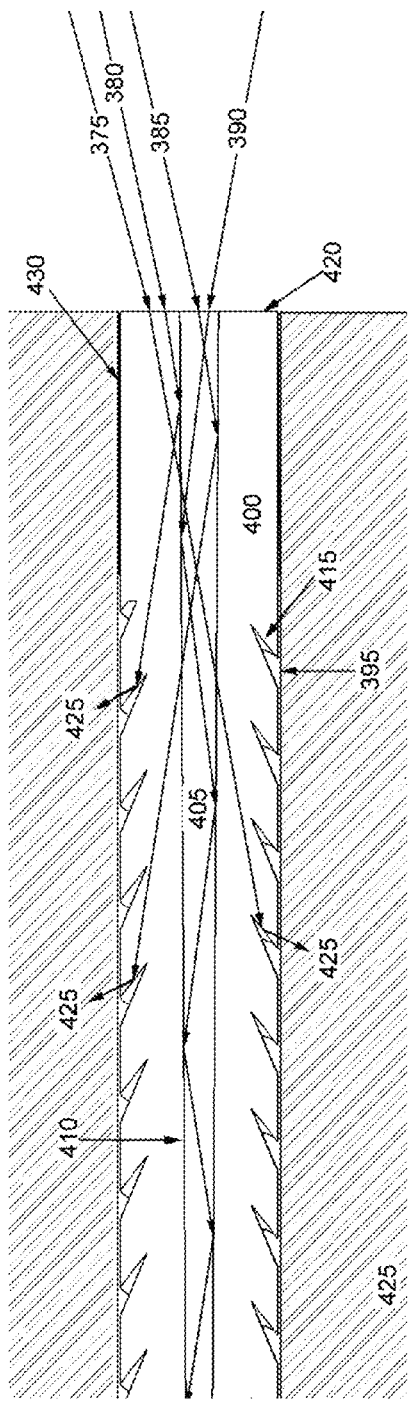
FIG. 9
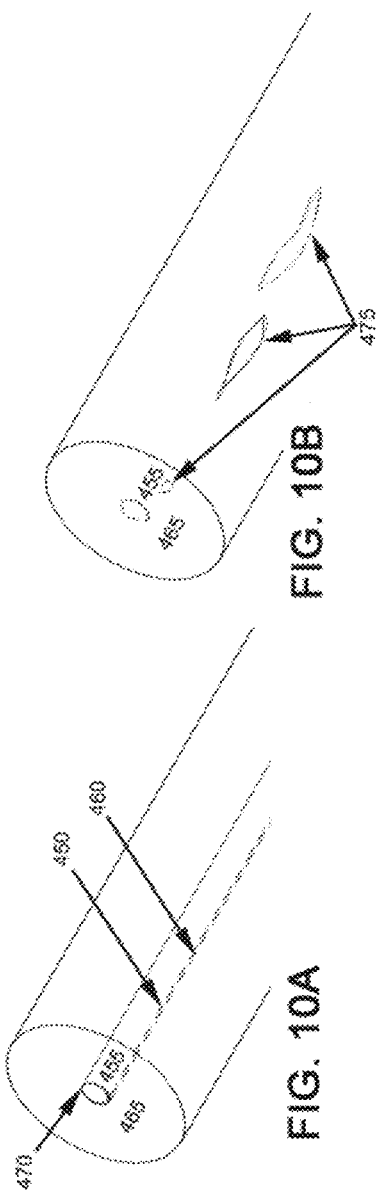
FIG. 10A
FIG. 10B

FIBER OPTIC TERMINATION

FIELD OF THE INVENTION

This invention relates to fiber optic terminations for coupling to surgical lasers (e.g., holmium lasers, CTH:YAG and Ho:YAG) and/or other low $M^2$ beam quality laser sources.

BACKGROUND

Holmium lasers primarily find application in urology for vaporization and enucleation of hyperplastic prostate tissue (BPH) and breaking apart kidney stones, although additional applications do exist for both soft and hard tissue targets. These infrared lasers produce 0.2 joule to 6 joule pulses at 350 ms to 750 ms pulse width and 5 pps to 80 pps at 2.08 µm to 2.14 µm for average powers ranging from 8 W to 120 W.

Holmium lasers generate multimode laser energy of particularly low $M^2$ quality. Thermally induced refractive index gradients and birefringence in holmium laser rods distort the laser output: both beam diameter and divergence drift during use and myriad modes are generated. Higher power holmium lasers employ two or more laser heads that are combined to produce the total laser output, further reducing the beam quality, and surgical lasers are subjected to jolts and bumps in hospital corridors, freight elevators, thresholds, etc., such that focusing optics are kept as robust and simple as possible. The results of this are focal spots that are large, misshapen and unstable, varying widely in parameters from manufacturer to manufacturer, throughout a single laser's lifetime and even within a single surgical session. (Nominal laser focal spot diameters (defined at $1/e^2$ maximum of semi-Gaussian profiles such that about 14% of the laser energy lies outside of the nominal spot diameter) for the first pulses are typically small and circular but balloon into unstable ovals of about 275 µm to about 500 µm.)

Many of the same characteristics of holmium lasers' output that make them attractive for vaporizing both hard and soft tissues add to the challenge of safely coupling fiber optics to deliver the energy; the high energy infrared pulses vaporize most materials, from polymers to metals. Optical fibers coupled to holmium lasers are routinely damaged by misalignment of the fiber core to the laser and the fibers damage the laser optics in turn; lenses are pitted or coated with organic and inorganic debris and vapor deposits, reducing performance subtly or dramatically. Subtle damage routinely goes unrecognized until accumulations result in catastrophic failure of the laser optics (blast shield, lens, mirrors, rods) or the optical fiber (at the connector or even meters away, within the patient).

Prior art designs are directed to producing fiber optic terminations that are capable of surviving significant core overfill when coupling to the laser; for example, where overfill energy is spatially filtered and typically reflected, scattered or absorbed. Some art seeks to capture at least some of the core overfill energy within the fiber core through tapered inputs (where the fiber core is larger at the input face) and others claim to reduce or eliminate coupling to the cladding, to the exclusion of the core.

These prior attempts fail to resolve high attenuation in silica-silica fiber is at 2100 nm which is highly dependent upon the mode population distribution within the fiber. Typical silica-silica fiber attenuation ranges from 1% to 3% per meter of fiber length for core modes while cladding modes are attenuated at roughly 10% meter (depending upon the secondary cladding material). Much of the energy that is lost to attenuation leaks from the fiber, into the polymer cladding and jacket. Fibers fail catastrophically where this leaked energy is of sufficient density to melt or burn the polymer layers surrounding the silica-silica fiber: a phenomenon referred to as "burn through" in the laser surgery field.

Microbending losses due to defects at the silica core to silica cladding interface are introduced during fiber preform production. Additionally, defects at the silica cladding to polymer cladding interface, stresses induced by the EFTE to fiber bonding and dimensional variations in the core are introduced when the fiber is drawn. Contributing sources to transmission losses may be within the control of the laser fiber designer, partially; for example, by selecting the best base fiber material to work with, establishing strict dimensional limits for core and claddings, and selecting among available polymer claddings. Unfortunately, insufficient cladding thickness continues to be a significant source of attenuation in holmium laser fibers.

Furthermore, cladding modes suffer greater attenuation than low order core modes and predispose a laser fiber to burn through failure. In striving to produce fiber terminations that survive spatial overfill of the fiber core, most current holmium laser fiber designs introduce new sources of cladding mode excitation. FIG. 1 illustrates two causes of cladding mode excitation in holmium laser fibers resulting from fiber termination defects. FIG. 1A depicts a fiber 5 where the fiber axis 10 is misaligned with the laser focus axis 15 such that the fiber acceptance cone α is misaligned with the laser focus cone θ and FIG. 1B depicts an angle polished fiber face 30 where the fiber face plane 35 is not orthogonal to the laser focus axis 40 such that the acceptance cone α of the fiber 45 is misaligned with the focus cone θ.

Cladding mode excitation that is due to the laser performance or damaged optics can only been mitigated by a fiber termination design, i.e. beam blooming (FIG. 2). Beam blooming is generally the result of thermal gradients within the laser, but some prior art fiber terminations amplify this problem by reflecting a portion of the laser energy back into the laser cavity, further destabilizing it or even pitting the rod face. FIG. 2A depicts a nominal holmium laser focus where the lens 50 is selected to focus a nominal output 75 of the laser rod at the focal plane 55 such that the focal spot diameter 60 is smaller than the core 65 of the fiber 70 and the focal cone angle θ is lower than the minimum acceptance cone α of the fiber 70. When holmium laser rods heat unevenly, the refractive index of the rod changes non-uniformly, producing a variable, and typically larger, diameter beam. FIG. 2B depicts the laser focus of FIG. 2A where the output 80 of the laser rod has bloomed in diameter due to thermal lensing such that it fills more of the focusing lens 85 causing the focal cone angle θ to increase, overfilling the fiber acceptance cone α and causing the focal spot diameter 90 to increase, overfilling the core 95 of the fiber.

Where the laser output blooms, the fiber meridional mode NA may be overfilled, as in FIG. 2B, but because the fiber core is larger than the nominal laser focal spot diameter, the core is not spatially overfilled. The overfilling of the fiber acceptance angle goes unnoticed in most cases because the polymer coating over the fiber's glass cladding is able to weakly guide the angular overfill, but should such fibers be subjected to bending stress, e.g. by the surgeon wrapping the fiber about his hand to gain a good grip, or by the fiber bending at the cystoscope working channel port, or just distal to the laser connection, higher order modes will be converted to cladding modes that are poorly guided, degrading the polymer cladding in a cascade of failure that typically ends catastrophically.

FIG. 3 illustrates mode conversion (mode promotion) within an exaggerated angle, tapered input fiber (neglecting refraction at the air:glass interface for simplicity in this illustration) where higher order focal modes 120 below the maximum acceptance cone angle of the fiber) (12.7°) are reflected within the taper 105 at the core:cladding interface at 130 and are raised in angle of propagation by the taper half angle of 2.5° to 12.5°. When the promoted rays encounter the taper wall a second time 135 they are again promoted by 2.5° at the core:cladding interface. The resulting angle of 15° exceeds the silica-silica numerical aperture such that, on a subsequent encounter with the taper wall 140, the rays pass through the core:cladding interface. These rays are again reflected, but by the glass:air interface of the polymer cladding free taper, and are promoted to 17.5° and finally to 20° just prior to entering the cylindrical fiber 110. In that the un-tapered fiber is coated with a low refractive index polymer, these 20° modes will be guided as cladding modes until they are lost to attenuation, exit the distal tip of the fiber, or contribute to a burn through failure.

FIG. 4 illustrates a method of compensating for mode conversion of higher angle excited modes where the same angle higher order mode as depicted in FIG. 3 150 is refracted at 160 by a negative curvature lens 155 such that the refracted mode never encounters the taper wall 175, but instead reflects for the first time within the cylindrical fiber 170 at 165. Using such a concave lens input, tapered input fibers may perform as well as, or better than, many straight input fibers, yet these types of terminations can excite and convert cladding modes under more stressful conditions such as beam blooming or scatter in damaged optics.

Other fiber termination strategies, e.g. FIG. 5, may also inadvertently launch cladding modes. U.S. Pat. No. 7,090,411 (Brown) discloses a glass ferrule 235 surrounding a polymer denuded fiber 230 with unpolished (saw cut) glass faces 220 & 245 acting as diffusers as well as internal multifaceted reflectors and reduced diameter input fibers. Such scattering elements, as exemplified by 220 and 245, scatter laser focal rays 210 with the bulk of the overfill energy being redirected toward polymer clad 250 and ETFE buffered 265 segments of the distal fiber such that very high order scattered modes may couple to the fiber core:cladding within the polymer-free segment proximal to 215 and become guided as cladding modes within the polymer clad fiber at 250. Employing tapered fibers in the reverse of FIG. 3 will convert higher order modes to lower orders only when the taper axial alignment is assured and taper angles are lower than the highest order modes excited within the fiber core.

Accordingly, improvements in fiber termination technologies are desirable.

SUMMARY

A first embodiment is a fiber termination that includes an optical fiber having a terminus, adjacent to the terminus a clad fiber and distal from the terminus and adjacent to the clad fiber a polymeric-coated fiber. The clad fiber includes a silica core and an F-doped silica cladding and the polymeric-coating fiber includes the clad fiber carrying one or more polymeric coatings. The fiber termination also includes a mode stripper fused to the clad fiber. The mode stripper includes at least one silica spring and/or silica tube. The silica tube has or carries at least one furrow, the furrow or furrows covering all 360 radial positions about the silica tube. Preferably, the silica spring and/or silica tube and the clad fiber have refractive indices that are approximately equal.

A second embodiment is a method of manufacturing an optical fiber termination. The method can include providing an optical fiber that includes a denuded portion adjacent to a terminus; then forming a mode stripper by either (A) positioning a silica tube about a length of the denuded optical fiber; fusing the silica tube to the denuded optical fiber; and then forming furrows in the silica tube; or (B) positioning a silica spring about a length of the denuded optical fiber; and then fusing the silica spring to the denuded optical fiber. The process additionally includes positioning the mode stripper within a silica ferrule; and then sealing the silica ferrule to the optical fiber.

A third embodiment is a method of manufacturing an optical fiber termination that includes fusing a silica tube to a terminus of a clad fiber; and forming one or more furrows in an exterior surface of the silica tube.

BRIEF DESCRIPTION OF THE FIGURES

For a more complete understanding of the disclosure, reference should be made to the following detailed description and accompanying drawing figures wherein:

FIG. 1A and FIG. 1B illustrate two causes of cladding mode excitation in the holmium laser fibers resulting from fiber termination defects found in prior art;

FIG. 2A and FIG. 2B illustrate holmium laser beam bloom and its consequences;

FIG. 5 is based upon U.S. Pat. No. 7,090,411, showing quartz ferrule sleeved optical fiber termination with integral beam scattering elements;

FIG. 6 depicts the one embodiment of the herein presented optical fiber termination;

FIG. 9 is a representation of the fates of various launch modes within a tapered input fiber fused within a helical groove equipped ferrule, shown for example in FIG. 8;

FIG. 10A and FIG. 10B are isometric views of a fiber within a closely fitting ferrule for fusion;

FIG. 12A is another example of the herein described optical fiber termination; FIG. 12B is an expanded cross-section of FIG. 12A taken on line B-B; FIG. 12C and FIG. 12 D are expanded views of detail C and detail D of the termination shown in FIG. 12B; FIG. 12E is an expanded view of detail E shown in FIG. 12D;

Figure 3:
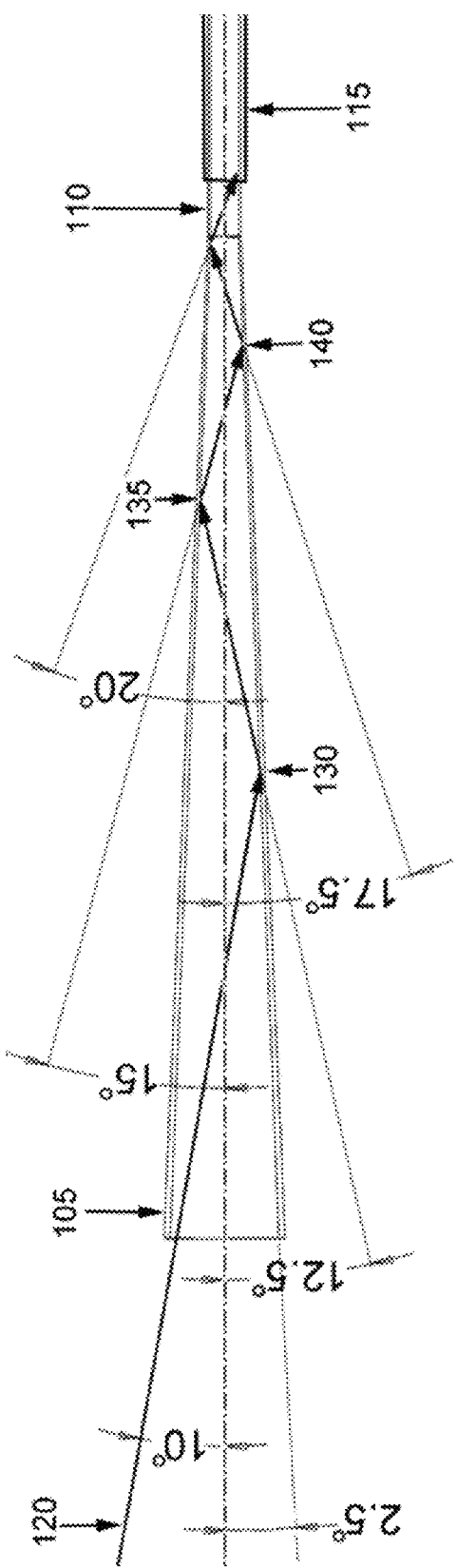
FIG. 3 is a cross-section of a tapered input fiber, showing the fate of a high order laser focus mode in coupling to a fiber through the tapered segment of U.S. Pat. No. 6,282,349.
Figure 4:
FIG. 4 is the same taper input as depicted in FIG. 3, showing the altered fate a high order laser mode when coupled through an input face equipped with a concave lens according to U.S. Pat. No. 7,488,116.

While specific embodiments are illustrated in the figures, with the understanding that the disclosure is intended to be illustrative, these embodiments are not intended to limit the invention described and illustrated herein.

DETAILED DESCRIPTION

Disclosed herein is a fiber optic termination which affects a more uniform and diffuse absorption of spatial overfill energy and segregates overfill energy and potentially damaging modes from efficient excitation of modes which are safe to deliver to the bulk fiber. The disclosed fiber optic termination includes a tapered or straight clad fiber carrying a mode stripper (e.g., a thin wall silica tube that includes energy-redirecting furrows, cuts, channels, or slots; a silica spring; or a ferrule that includes energy-redirecting furrows, cuts, channels, or slots).

As used herein, parts or portions of devices or items may be described as quartz or silica parts. Generally, these terms are interchangeable and any embodiment reciting a quartz part should be understood to include or disclose a silica part. As used herein, "cladding modes" refer to light that is not guided by a glass-core-to-glass-cladding boundary but is guided by the glass-to-polymer-cladding boundary, regardless of the source. Multimode fibers that are used in holmium laser surgery are step index and "doubly clad" with a fluoropolymer coating of lower refractive index than the fluorine-doped (F-doped) silica cladding. A secondary numerical aperture (NA) of approximately 0.33 to 0.41 is produced by this polymer coating, such that it is often referred to as "secondary cladding". These fibers are buffered (or "jacketed") with a relatively thick layer of polymer, typically ethylene tetrafluoroethylene (ETFE) copolymer (refractive index ~1.4 @ 633 nm) that is dyed blue or green to enhance visibility within the surgical field. Additionally and as used herein, a "polymeric-coated fiber" refers to a clad fiber carrying a fluoropolymer cladding and/or a fluoropolymer jacketing and/or another polymeric coating.

In one embodiment, a fiber termination includes an optical fiber having a terminus, adjacent to the terminus a clad fiber and distal from the terminus and adjacent to the clad fiber a polymeric-coated fiber. Herein, a "clad fiber" refers to a fiber that includes a silica core and an F-doped silica cladding. The polymeric-coated fiber includes the clad fiber carrying one or more polymeric coatings. The fiber termination additionally includes a mode stripper fused to the clad fiber; the mode stripper includes at least one silica spring and/or silica tube. The silica tube has or carries at least one furrow, the furrow or furrows covering all 360 radial positions about the silica tube. Preferably, the silica spring and/or silica tube and the clad fiber have refractive indices that are approximately equal.

In one example, the mode stripper includes a silica tube having a helical furrow. Preferably, the helical furrow has a leading edge selected from the group consisting of an edge perpendicular to a fiber longitudinal axis, an edge angled relative to the fiber longitudinal axis, and a mixture thereof. In one instance, the mode stripper includes a silica tube which has a helical furrow, the helical furrow having a leading edge which transitions from an edge perpendicular to a fiber longitudinal axis to an edge angled relative to the fiber longitudinal axis. In another instance, the leading edge of the helical furrow is angled at about 38° relative to the fiber longitudinal axis.

In another example, the mode stripper is a silica spring. Preferably, the silica spring is fused to the clad fiber such that the clad fiber is exposed within the spring pitch. Herein, the spring pitch is understood to mean the distance from center to center in adjacent coils of the spring. As used in relation to the silica spring fused to the clad fiber, portions of the surface of the clad fiber are not covered by the glass of the silica spring when the spring and fiber are fused together.

As described herein, the fiber termination requires at least one mode stripper. While a plurality of diameter-equal mode strippers, fused to the clad fiber, is possible a plurality is not necessary to the function of the invention.

In another example, the fiber termination includes a silica ferrule fused over the mode stripper. Preferably, the silica ferrule is fused to the clad fiber proximal to the terminus. In one instance the silica ferrule can be fused to the mode stripper, where, preferably, the silica ferrule is not fused to the mode stripper. In a preferable example, the silica ferrule is a fused-quartz ferrule; that is, the silica ferrule is composed of fused quartz.

The silica ferrule, preferably, has or carries at least one furrow, the furrow or furrows covering all 360 radial positions about the silica ferrule. In one instance, the silica ferrule has a helical furrow. That is, the furrow transitions about the ferrule in a helical pattern along the longitudinal length of the ferrule (e.g., see FIG. 8). The furrow can have a leading edge selected from the group consisting of an edge perpendicular to a fiber longitudinal axis, an edge angled relative to the fiber longitudinal axis, and a mixture thereof. Preferably, the silica ferrule includes a furrow that has an edge angled relative to the fiber longitudinal axis. In another instance, the silica ferrule is fused over a mode stripper; where the mode stripper can be a silica tube that has a helical furrow. Here, the mode stripper helical furrow, preferably, has a leading edge that transitions from an edge perpendicular to a fiber longitudinal axis to an edge angled relative to the fiber longitudinal axis.

In yet another example, the fiber termination has a terminus which includes a convex or conical lens on the silica ferrule. Preferably, the terminus includes a concave lens that covers at least 90% of the silica core. Even more preferably, the terminus includes both a concave lens on the silica core and a convex or conical lens on the silica ferrule. Still more preferably, the concave lens is formed, at least in part, from the silica core (i.e., from a concave shaping of the silica core terminus).

In still another example, the fiber termination includes a tapered clad fiber. That is, at least a portion of the clad fiber, between the terminus and the polymeric-coated fiber, is tapered. In one instance, the mode stripped can be fused to the tapered clad fiber, preferably, with a silica ferrule fused to the clad fiber proximal to the terminus. Notably, in this instance, the silica ferrule is not fused to the mode stripper, and preferably, there is an internal vacancy between the mode stripper and the silica ferrule.

The fiber termination can further include connectors adapted to join the fiber termination to a laser source, and/or parts adapted to hold the optical fiber to the fiber termination, or hold the parts of the fiber termination together during use or, for example, sterilization. In this instance, the fiber termination can, for example, include a crimp ferrule bound to the polymeric-coated fiber and surrounding the mode stripper and/or a silica ferrule; and/or include a connector ferrule surrounding the mode stripper and/or silica ferrule.

Another embodiment is a method of manufacturing an optical fiber termination. One method includes providing an optical fiber that includes a denuded portion adjacent to a terminus (e.g., by denuding a portion of an optical fiber). Then forming a mode stripper on the denuded optical fiber by either (A) positioning a silica tube about a length of the denuded optical fiber; fusing the silica tube to the denuded optical fiber; and then forming furrows in the silica tube; or (B) positioning a silica spring about a length of the denuded optical fiber; and then fusing the silica spring to the denuded optical fiber. The process can further include positioning the mode stripper within a silica ferrule; and then sealing the silica ferrule to the optical fiber. Preferably, the mode stripper is fused to the clad fiber, then the silica ferrule is positioned about the fiber and mode stripper, and then the silica ferrule is fused to the clad fiber. The process can further include forming furrows in the silica ferrule. Preferably, the process further includes forming a concave lens on the terminus of the denuded optical fiber.

Still another embodiment is a method of manufacturing an optical fiber termination that includes fusing a silica tube to a terminus of a clad fiber; and forming one or more furrows in an exterior surface of the silica tube. Preferably, this process additionally includes providing a mode stripper having one or more furrows between the clad fiber and an interior surface of the silica tube; wherein the mode stripper is fused to the clad fiber.

Additional embodiments and features can be understood in relation to the figures: for example, FIG. 6 depicts a fiber optic termination that includes a means for addressing fusion and transmissive problems of the prior art; this fiber optic termination scatters spatial and angular overfill energy throughout a larger section of the fiber connector for straight and/or tapered fibers. The embodiment of the fiber optic termination depicted in FIG. 6. includes a tapered fiber 270 within a tapered bore 280 of a quartz tube 275 where the angle of the tapered bore 280 closely matches the angle, diameter or outer surface of the tapered fiber 270. The depicted embodiment further includes perforations 285 periodically placed along the length and circumference of the tube 275, where the perforations 285 can, for example, vent gases captured between the tapered fiber 270 and the tapered bore 280 of the tube 275 that would otherwise interfere with fusion of the fiber to the tube. Laser focal rays exceeding the acceptance cone angle for meridional modes within the fiber, regardless of where the rays entered the fused face 310, are refracted or reflected upon encountering the periodic perforations 285. While the perforations depicted in FIG. 6 are symmetrically spaced for ease of illustration, random, helical, close-packed, or other arrangement of the perforations 285 are possible; asymmetric perforations can prevent high order modes from passing through the quartz tube 275 without encountering a perforation 285.

Figure 7:
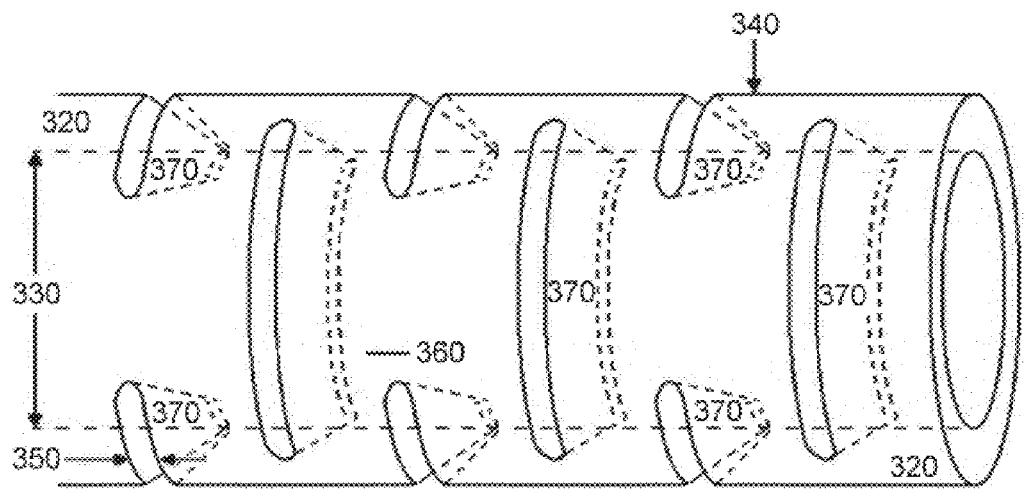
FIG. 7 is one example of a ferrule useful in the optical fiber termination in FIG. 6.

FIG. 7 illustrates another example of a quartz tube 320. In this instance, the tube 320 can include a cylindrical bore 330 (e.g., for fusion to a straight fiber), with circumferential slots 370, shown angled and elongated. The circumferential slots 370 can cover alternating and overlapping segments of the 360° tube circumference from the outer diameter 340 to the inner diameter provided by the cylindrical bore 330. The width of the slots can be wider at the tube OD 350 than at the tube ID 360. The differentiating width of the slots 370 can be provided by varying the focal cone of a laser used to form the slots and for ease of differentiating between the slot openings. The slots can be pitched forward; that is, oriented with the narrow opening 360 more proximal to a termination or face than the wide opening 350. This pitched arrangement can produce reflective surfaces (as defined by Snell's Law for rays entering the tube from the right (the fiber optical aperture after a fiber has been fused within the tube 320)).

Figure 8:
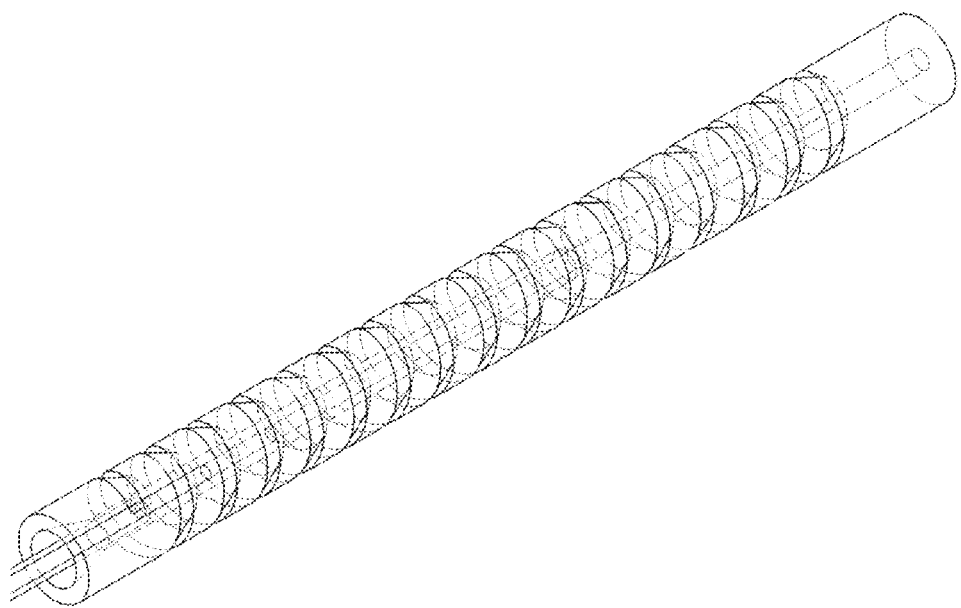
FIG. 8 is an example of a ferrule in an optical fiber termination showing a single, helical slot, groove or furrow with an acute angle leading edge cut into the outer diameter of the protective ferrule about a tapered input fiber.

FIG. 8 depicts a single, helical slot within the wall of the tube. In another instance the tube can include a plurality of helical slots that are the same or different. The helical slot can be pitched forward, as described above, and/or have a differentiating width, as described above. In one instance, the compound angle of the front face of the helical slot can be shaped (have an angle relative to an incoming light ray) to cause total internal reflection of spatial overfill rays as well as leaking cladding mode rays.

The slots, perforations, cuts, or grooves in the tube can be positioned, pitched, and sized to address the following issues:

a) meridional and skew modes may be differentially affected by the slot, furrow or groove geometry and a plurality of pitch and path may be employed;

b) spatial overfill and stripped cladding modes may be affected by virtue of the helical pitch alone and a helical slot, furrow or groove with less forward pitch to no forward pitch (i.e., perpendicular to the length of the tube) may be employed;

c) refracted rays entering the fused fiber assembly without scattering may be redirected by a helical slot, furrow or groove with a leading edge face that is parallel to the laser focal plane;

d) total internal reflection (TIR) or redirection of unwanted modes or radiation can be provided by including angled, intermittent angled, angled helical, and/or angled intermittent helical slots, furrows or grooves ("redirecting grooves") that do not penetrate the tube to the bore (or to the fiber cladding);

e) overfill radiation and cladding modes can be redirected at different positions along the length of the tube by, for example, including grooves, slots, or furrows of varying depth of penetration;

f) skew rays can be redirected into elements surrounding the tube by, for example, including redirecting grooves with differentiating (e.g., opposite) pitches, where, for example, the pitches overlap, where at least one of the slots does not completely penetrate to the tube bore, and/or where the groves may be included on different sections of the tube;

g) cladding modes and higher order modes prone to promotion to cladding modes can be stripped by, for example, fusing (e.g., total fusion of the fiber and the tube) the fiber and the tube by way of a continuous path within closely matching refractive index material (i.e. between the fiber and the tube);

h) a curved input surface, or lens, that extends radially from the center of a fiber core but does not cover the entire core (and/or laser focal spot diameter at the fused input face) can separate mode populations within the laser focus for differential treatment within the fiber termination, and i) a gradient index (GRIN) lens may be employed for discriminating among modes within the laser focus for differential fates within the fiber termination.

FIG. 9 depicts, in cross section, the propagation and/or stripping of light rays (375, 380, 385, 390) within, for example, the a fiber optic termination that includes the tube depicted in FIG. 8. Herein, each ray represents of a category of laser focus energy imparting the input face 420 of the termination. Two rays 375 and 380 that enter the termination through the quartz tube 400, where ray 375 represents angles outside of the fiber's maximum acceptance angle (e.g., ~12.7° for meridional modes, higher for skew modes) and ray 380 represents angles at or below the fiber's maximum acceptance angle but within the tube 400. Two rays 385 and 390 enter the fiber core 405, where ray 385 represents rays at about the fiber's maximum acceptance angle and those that are above the fiber's maximum acceptance angle, ray 390 represents rays at angles sufficiently below the base fiber maximum acceptance angle such that mode promoting reflections from the taper wall do not convert the rays to cladding modes.

In one method of using the herein described fiber optic termination, ray 375 is diffracted at the planar termination face 420 and passes through the fiber as the angle of incidence on the fiber surface is too high; then the ray encounters a leading edge 415 of a helical groove (bottom) where the ray is reflected into the connector ferrule 425. Ray 380 can be guided at an interface 410 between the tube 400 and the core 405. The interface can be between the tube and cladding and/or between the cladding and the core. Ray 380 reflects at the interface and then encounters a leading edge 415 of the helical groove 395 where the ray is reflected into the connector ferrule 425. Ray 385 enters the termination at the core face but is of an angle very near the maximum acceptance angle of the silica core. After being guided through one reflection at the interface 410 within the taper, the ray enters the tube 400 and encounters a leading edge 415 of the helical groove 395. This ray 385 is then reflected into and absorbed by the connector ferrule 425. Ray 390 represents rays that enter the fiber core at the input face 420 and are of low enough angles to be captured by the tapered fiber/fiber core/silica core.

The herein described embodiments prevent rays 375 and 385 from being captured by silica core 405 and delivering those rays as cladding modes to a polymer clad portion of the fiber, as would occur if the core was "air clad", that is not fused to the tube 400. In one example, a concave surface at the input 420 to the silica core 405 may refract some rays such as ray 385 to angles that can be captured by the silica core 405 and conducted to the distal fiber. This example may further include a partial fusion of the core 405 to the tube 400.

While the example depicted in FIG. 9 discriminates between spatial overfill and angular overfill in the termination, this discrimination may be limited by the instability of the laser focus and errors in alignment of the termination to the nominal laser focus. With a flat input face 420, the boundary between the energy permitted to excite modes within the fiber core 405 and rejected and redirected is within a dynamic continuum of the presented energies. A perfect termination would include centricity of the fiber to the laser focus, alignment of the fiber to the focal axis, a round and invariable diameter laser focus, and a planar fiber input face that is parallel to the laser focal plane and produce a demarcation between unwanted and desirable energy which would be consistent temporally and about the circumference of the termination. Unfortunately, the temporal instability and asymmetry of the laser beam quality and the sum of the tolerances in any termination design (e.g., as depicted in FIG. 9) cannot divide the energy continuum consistently in either space or time. That is, elements of each population will be mixed with elements of the other with respect to their fate.

Total fusion of a relatively thin fiber, straight or tapered, within a relatively thick wall tube is extremely difficult to accomplish without defects (total fusion being circumferential fusion of a substantial length of the proximal fiber, i.e. 1 cm to 2 cm, within the tube). Contrary to rationales offered in the prior art, the competing demands of centricity and displacement of gases between the fiber cladding and the tube bore lead to defect formation during fusing, even in terminal fractions of less than 1 mm.

When heating a thick wall tube, relatively large areas of the tube reach sintering temperature at approximately the same time, even with the positional precision of a $CO_2$ laser in applying heat for fusion. Closely fitting fibers (within a tube bore) tend to fuse preferentially where close contact is closest: where the tube bore wall is tangent to the fiber cladding outer diameter. As illustrated in FIG. 10A, the contact between the fiber 455 and the tube 465 is the line of tangency 470 between the closely matching fiber outer diameter 450 and the tube bore diameter 460; fusion will occur at this line of contact first, and over a considerable length of the fiber in the tube. The difference between the fiber 450 diameter (0.44 mm) and the tube bore 460 (0.460 mm) is depicted in FIG. 10A is about 20 µm because to depict the ~2 µm difference of a close fit, one assuring centricity, simply cannot be clearly represented in a drawing, but the principles illustrated remain valid for an ~2 µm difference.

In and of itself, preferential fusion of part of the diameter of a fiber within a closely fitting tube is not a problem, but a consequence of this fusion is the formation of a very thin film of air on either side of the fusion line, expanding to ~2 µm on the opposite side of the fiber. As fusion proceeds FIG. 10B, areas of very thin film air (or gases produced by combustion of organic contaminants on the fiber outer diameter or the tube bore) tend to be trapped as islands absent fusion 475, often evident by interference patterns.

This problem is solved by increasing the difference between the fiber diameter and the tube bore to roughly 40 µm to 80 µm and by restricting movement of the fiber within the bore during fusion. While the applied $CO_2$ laser energy for melting the tube is still dispersed over a relatively large area, the area where the tube bore begins to close due to surface tension within the melt is quite small: a ring of fusion that is about 100 µm forms between the fiber and the tube when heated under rotation in a focused $CO_2$ laser beam. By scanning the laser distally along the tube (with the fiber centered within), from the plane where fusion initiates, the fusion front advances uniformly and a large gap is maintained between the fiber outer diameter and the tube bore wall to allow expanding atmosphere and gases of combustion to escape.

Prior art methods for centering and restricting a fiber from moving off center during fusion have proven inadequate to the task due to (a) remaining variability in centricity and (b) separation of the centering mechanism to the fusion region permitting static attraction and melt surface tension to overcome fiber rigidity. As a result, the centricity of the fiber within the tube is generally far from perfect and the core and cladding may be visibly distorted within the fusion region; greater distortion generally results where tube wall thicknesses exceed the fiber diameter and eccentricity errors appear larger where the gap between the tube bore and the fiber diameter is small.

Embodiments of the invention disclosed herein offer solutions to these issues while enabling far greater discrimination among desirable and undesirable portions of the laser focus energy.

Figure 11:
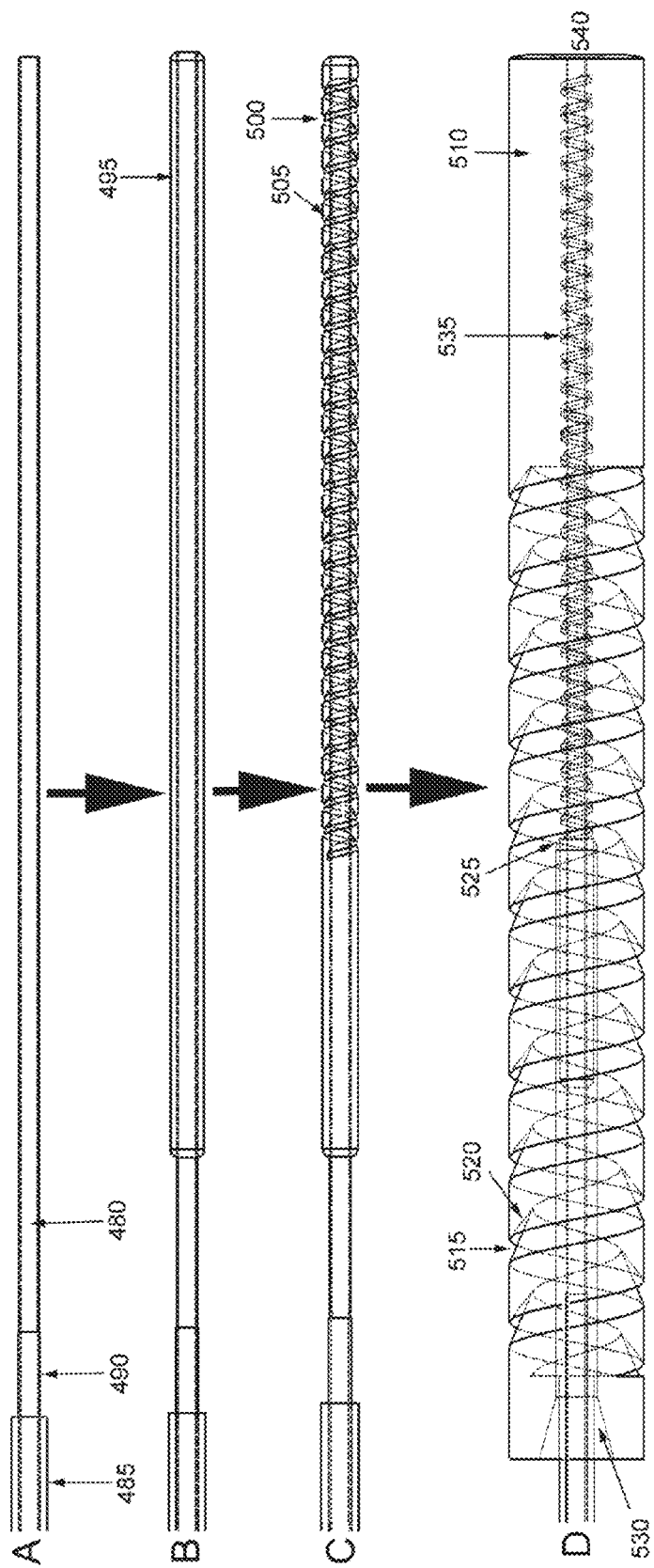
FIG. 11 is a schematic of the production of one example of the herein described optical fiber termination.

Another embodiment includes a thin walled quartz tube or silica spring fused about the clad fiber and a thicker walled ferrule fused about the thin walled quartz tube or spring. This embodiment reduces or prevents the formation of any centricity error or defects in the fusion junction(s). FIG. 11 depicts steps in the manufacture of this embodiment, for a straight termination fiber. The manufacturing process can begin with a stripped optical fiber; in FIG. 11A, the optical fiber can include, for example, a 200 µm core within a 240 µm clad fiber 480 (wherein the distances are to the outside diameter of the fiber). The clad fiber 480 is exposed when the Tefzel buffer 485 and the polymer hard cladding 490 have been removed, for example over about a 1.5 cm section.

As used herein, an optical fiber is understood to include a plurality of parts. Within the fiber is a core or fiber core that typically consists of a synthetic silica glass. The core carries a synthetic silica cladding that typically consists of a fluorinated silica glass—the combination of the core and the cladding is referred to as a clad fiber. Commonly, the clad fiber further carries one or more polymeric coatings, for example a polymer hard cladding (often carried by the silica cladding) and a Tefzel buffer layer (often carried by the polymer hard cladding). The process of removing the polymeric coatings can be called stripping or denuding the optical fiber; in some circumstances the clad fiber is called a denuded fiber.

FIG. 11B depicts the addition of a thin wall quartz tube 495 to the clad fiber 480, e.g., with a bore of roughly 280 µm and an outer diameter of 420 µm. Notably, the thicknesses provided herein indicate one example of the invention but are primarily provided for tolerances and relative thicknesses. The thin walled quartz tube 495 can be fused over the fiber segment 480 producing a sleeved fiber (or over-clad fiber) section on the proximal terminus. FIG. 11C depicts the result from the production of a helical furrow 500 over, e.g. about 50%, 60%, or 70% of, the proximal terminus of the thin walled quartz tube 495. The helical furrow 500 can include a leading edge angled at approximately 38° relative to the fiber longitudinal axis (TIR profile). Preferably, in this embodiment, the helical furrow does not contact or reach to the proximal terminus but stops short of either or both ends of the quartz tube 495. A heavy wall quartz ferrule 510 can then be positioned over the thin walled quartz tube 495 and fused to the thin walled quartz tube 495. For example, FIG. 11D depicts a heavy wall quartz ferrule 510 with a bore 525 of roughly 500 µm and an outer diameter of about 1.63 mm fused over the furrows 500 of the thin walled quartz tube 495. Preferably, the fusion ceases just after the sleeved fiber furrow 500 ends. More preferably, the fusion yields a hermetically sealed, helical space 535 about the fiber segment 480. In one example, a second helical furrow 515 can be added to the heavy walled quartz ferrule 510; preferably, this furrow includes a leading edge 520 at an angle appropriate for totally reflecting any laser radiation that imparts that edge. Thus a termination is produced presenting a fused face consisting of a core and cladding protected by a surrounding quartz ferrule upon which a curvature (lens) 540 may or may not be machined.

In certain embodiments, the addition of the thin walled quartz tube was found to be necessary for the production of the furrows close to or in contact with the clad fiber. While, one of ordinary skill in light of the disclosure herein could envision furrows or grooves positioned within the clad fiber, the cladding thickness is physically too thin to accept grooves of any significant depth without optically affecting the fiber core or the evanescent field within the cladding. Notably, the application of the thin wall quartz tube described above provides the material necessary to applying the furrows without adverse effect to the optical performance of the fiber within.

FIG. 12A depicts a completed fiber termination including the metallic end 625 of the termination. FIG. 12B shows a cross-sectional view of the components of the completed fiber termination. This termination can include an optical fiber 555 leading to a non-tapered clad fiber 550 (a section that was denuded of coating and buffer polymers). The clad fiber 550 can carry a thin walled quartz tube 565, preferably, equipped with a furrow that transitions 585 from a centro-symmetric profile 580 (where high order modes such as cladding modes refract substantially along the sleeve axis or reflect across the fiber axis) in a termination-proximal portion of the sleeved fiber, to a TIR profile 595 (with the acute, reflecting angle leading edge 590, where high order modes reflect substantially orthogonal to the fiber axis and into the connector wall) in a termination-distal portion. The completed fiber termination can further include a thick walled ferrule 570 fused to the quartz tube 565 at the terminus 575. The termination can further include an adhesive seal 560 between the optical fiber 555 and the ferrule 570; and/or a metallic crimp 625 which seats a gasket 615 to the ferrule 570 at the seal 560 and seals the internal vacancies 620 of the furrowed, sleeved fiber for example protecting the vacancies from intrusion of water vapor during sterilization.

In one example, the quartz tube 565 is fused within the surrounding, thick walled ferrule 570 but only adjacent 575 to the input terminus as opposed to over the entirety of the furrowed sleeve. In another example, the input face 630 of the termination is equipped with a negative (concave) lens 600 on approximately 90% of the fiber core, transitioning to a slightly convex annulus 605 about the outer 10% of the fiber core and the F-doped silica cladding 610. The compound curvature of the input face 630, as opposed to the flat input face of the example in FIG. 9, separates higher order focal rays at the periphery of the laser focus from lower order rays at the center of the focus, refracting and exciting lower order modes within the fiber core while refracting higher order modes in the opposite direction, to angles that may be stripped from the surrounding ferrule 570 by a furrow or furrows applied to the outer diameter (not shown in FIG. 12).

The compound curvature of the lenses 600 and 605, the placement of the transition in curvatures and the nature of the transition (gentle to sharp) serve to compensate for vagaries in discrimination between desirable and undesirable energy populations within the unstable laser output and for errors in centricity and angular alignment within the termination. In using only a fraction of the fiber core for accepting desirable radiation, the boundary between acceptable and unacceptable radiation may be maintained within the core dimension such that unacceptable energy that may inadvertently drift into the transition region within the core diameter continues to be refracted to angles that are subject to redirection within the furrow features of the sleeve and/or the outer ferrule rather than coupling to the core.

Variants possessing transitioning furrow profiles (or multiple profiles upon various sections of the sleeved fiber and/or the surrounding ferrule) enable selection of the location(s) within the connector's (metal) ferrule where unwanted energy is to be dumped.

Preferably, non-tapered (or straight input) fibers (e.g., FIG. 12) and tapered input fibers (e.g., FIG. 14) include a negative lens 600 on the input face. In one instance, tapered input fibers include a negative (concave) lens with a larger radius of curvature and thereby avoid mode promotion of higher order modes by reflections on the conical taper wall. Preferably, the curvatures of the lens on a straight input and the lens on a tapered input fiber will differ due to differences in the effective fiber NA at the fusion face. The diameter of the concave lens (or the placement of the transition from concave to convex) will determine the highest order mode accepted for coupling to the fiber and the lowest order mode that is excluded from coupling to the fiber. The curvature of the convex annulus will determine how far off axial that those excluded modes are refracted.

Figure 12:
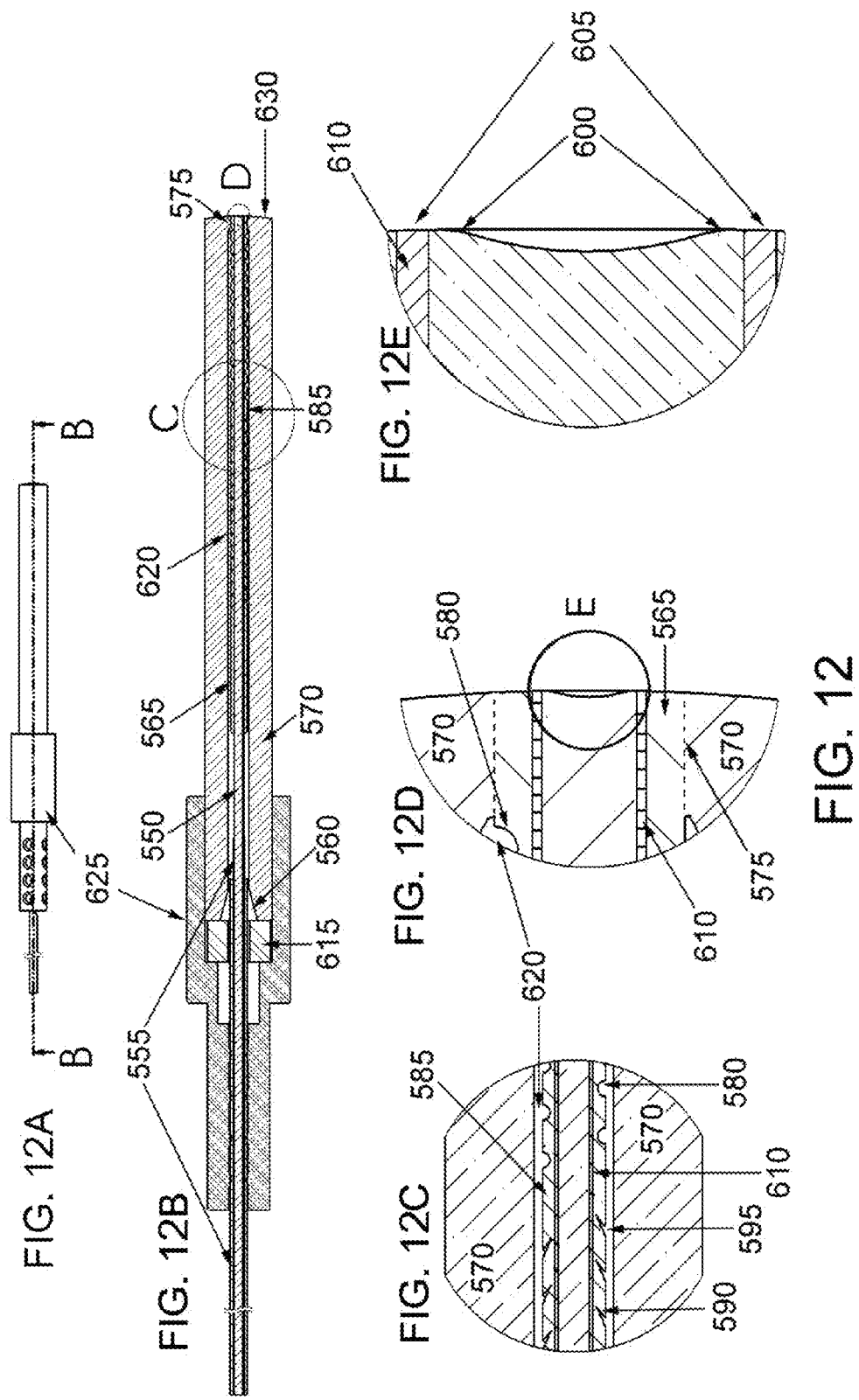
Figure 13:
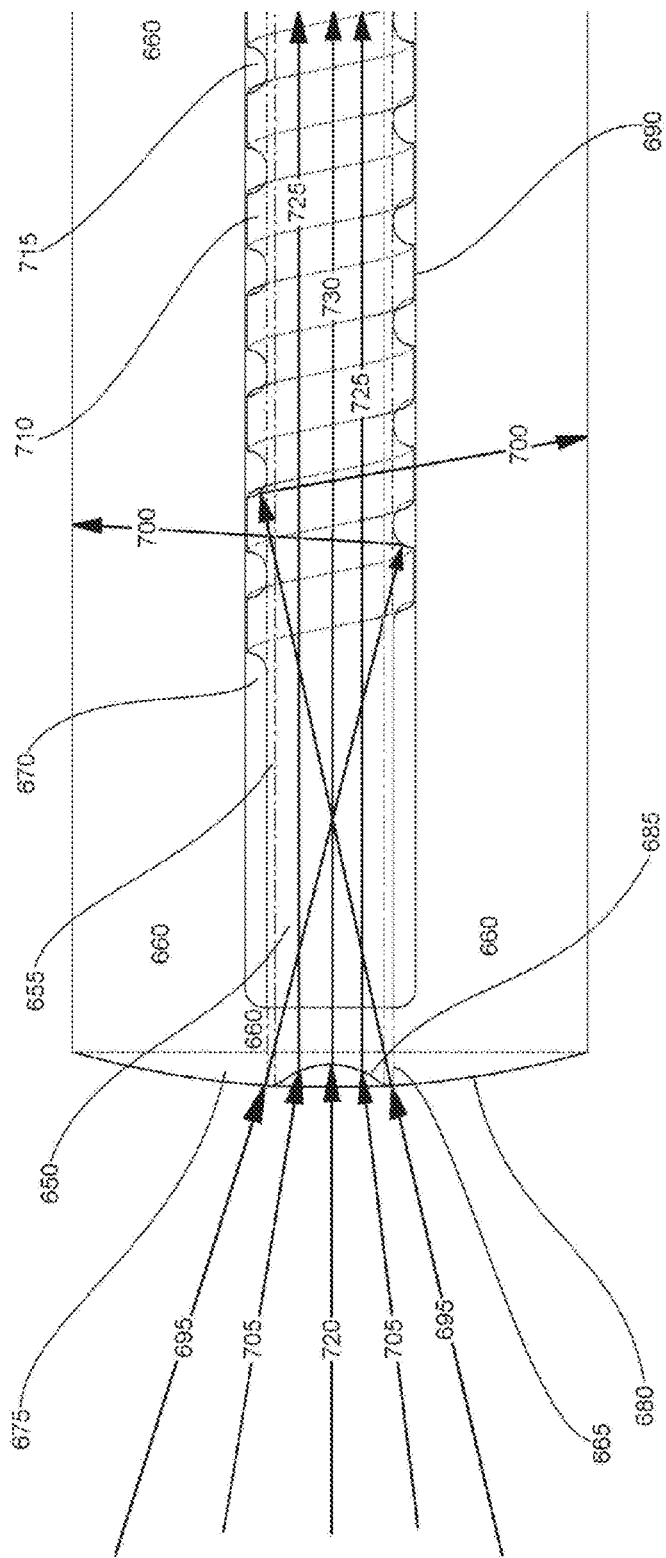
FIG. 13 is a representation of the fates of various launch modes within a straight fiber termination equipped with a helical coil mode stripping and centering element as shown in FIG. 12.

FIG. 13 depicts the result of laser rays imparted upon a fiber termination (e.g., as shown in FIG. 12). Notably, the laser focus rays (705, 720) can be separated by the fiber termination and the higher order rays 695 are dispersed into the ferrule 660. The separation of the rays can be based upon what portion of the fused input face 675 they impart upon. In this example, a clad fiber 655 with a silica core 650 fiber carries a helical coil 710 of quartz fused onto the F-doped silica cladding 655. Herein, a helical coil 710 is employed as opposed to the above described thin walled quartz tube with furrows. The helical coil once fused to the silica cladding 655 yields a helical furrow 715 that reaches or penetrates to the surface of the clad fiber. The fiber termination can further include a quartz ferrule 660 (e.g., 18 mm long) having a bore diameter 690 that is slightly larger than the outer diameter of the helical coil 710 fused upon the fiber. Preferably, the ferrule has an outer diameter of roughly 1 mm to 1.8 mm.

In this example, the ferrule 660 is fused to the clad fiber 655 at the input face 675. This fusion can be accomplished by heating the quartz ferrule near the opening that will become the input face 675, for example by way of a $CO_2$ laser, causing the bore of the ferrule to shrink until it fuses to the clad fiber at 665.

FIG. 13 additionally depicts an input face 675 that includes a concave lens 685 across a majority of the silica core 650, and a convex lens 680 upon, preferably, the balance of the input face 675. In another example, a portion of the input face not covered by the concave lens can be covered by an annular prism/annular lens/conical lens presenting a sharp transition from the annular profile to the concave. The input face can be shaped by adjusting a $CO_2$ laser focal point for vaporization of the quartz ferrule, fused region, and/or the clad fiber. Notably, an "air gap" 670 remains (preferably, a partial vacuum where the quartz ferrule is sealed to the fiber at the distal opening, as shown in FIG. 12) about the fiber cladding near the input face 675 and within the furrows 715.

In one instance, low angle holmium laser focal energies 705 and 720 within the central ~85% of the beam profile (approximately the nominal focal spot diameter as defined by $1/e^2$ energy maximum) address the central and concave surface 685 of the fused input face 675 and are refracted, exciting substantially axial modes 725 and 730 within the fiber core 650. Were these low order modes to diverge enough to contact the core:cladding (650:655) boundary of the fiber, they will be easily guided.

For the purposes of this example, the high angle holmium laser focal 695 within the peripheral ~15% of the semi-Gaussian beam profile (outside of the nominal $1/e^2$ focal spot diameter), is assumed to be within the acceptance cone of the base fiber NA. That is, if the fiber core diameter larger and the fiber input face flat, aligned with and centered upon the laser focal spot, rays 695 would excite core modes that would be guided within the fiber, albeit as high order modes that are more susceptible to promotion to modes that are damaging to the fiber within deflected portions of the fiber. The higher order rays 695 of the holmium laser focus impart the convex portion of the fused input face 675 and are refracted in the opposite manner as the lower order rays 705 and 720. The resulting modes are not guided by the core:cladding (650: 655) boundary of the fiber, but leak into coils of the silica spring 710 and are reflected at substantially, orthogonal angles 700 to the fiber axis and are absorbed by the surrounding SMA ferrule wall. Notable, throughout the disclosure reference is made in SMA components or parts as SMA connections are common for the connection of optical fibers to laser sources. Other connections/connectors are available, including but not limited to SMB, SMC, GT5, MCX, MMCX, BNC, FME, TNC, and N-type connectors.

Accordingly, the compound curvature of the termination input face 675 separates laser focal population into rays of two distinct populations: a high order (represented by rays 695 that are redirected 700 and absorbed) and a lower order population (represented by rays 705 and 720 that are guided 725 and 730); thereby disrupting what would have been a continuum of modes provided by a flat input face termination. The two new mode populations are further separated by redirection in the mode stripping segment (the helical coil of silica 710 fused to the fiber cladding 655) where, in terminations lacking this feature, these rays would be guided as cladding modes and would predisposed the fiber to burn through failure in deflection. A second redirecting groove or furrow such as that depicted in FIG. 8 may be produced upon the ferrule 660 outer diameter to augment redirection of unguided modes within the termination in that not all of the laser focal energy will behave as predictably as those depicted in FIG. 13 within an actual termination.

In contrast to prior art where laser focus that spatially overfills a fiber core is scattered at one or more random scattering elements within the termination, the invention described herein is capable of actively selecting and redirecting both spatial and angular overfill energies, as well as other energy that may be undesirable to couple to the fiber. The disclosed structure eliminates the random redirection and the coupling of undesirable energy modes within the fiber by division of the continuum of mode populations (within the laser focal cone) into populations that are readily guided or readily redirected. The absorption distribution is also controlled and diffuse within the disclosed terminations, whereas prior art absorptions are largely concentrated at loci that are particularly susceptible to thermal damage.

The herein disclosed terminations also serve to provide centering of both tapered and straight fibers within the larger bore of the surrounding ferrules, thereby providing minimally distorted and concentric fusion junctions (as discussed above with reference to "total fusion"). The mode stripping elements that are fused about the claddings of the fibers may be positioned a few millimeters distal to the fusion junction to produce a localized larger diameter upon which a closely fitting surrounding quartz ferrule bore may be disposed. The close fit provides an excellent, proximate and refractory centering element for a relatively large gap between the clad fiber within the ferrule bore that is unavailable in prior art. Prior art solutions that centered the fiber proximate the fusion junction, such as U.S. Pat. No. 7,309,167 and U.S. Pat. No. 7,699,535, employ a chamfer to locally increase the ferrule bore diameter at the fusion junction while using the original, close fitting ferrule bore for local centering. These prior art examples have the unintended consequence of refracting and scattering any overfill energy, at the conical bore surface, to high angles within the surrounding ferrule. This unintended and uncontrolled scatter is carried by the air clad ferrule to the back of the termination where heat labile materials reside and optical coupling to the polymer clad fiber may occur. The herein described terminations provide fiber to ferrule fusions with improved angular alignment and centricity without scattering; lessening of the thermal dissipation load within the termination; and reduction of cladding modes coupled to the fiber in the distal portion of the termination.

Figure 14:
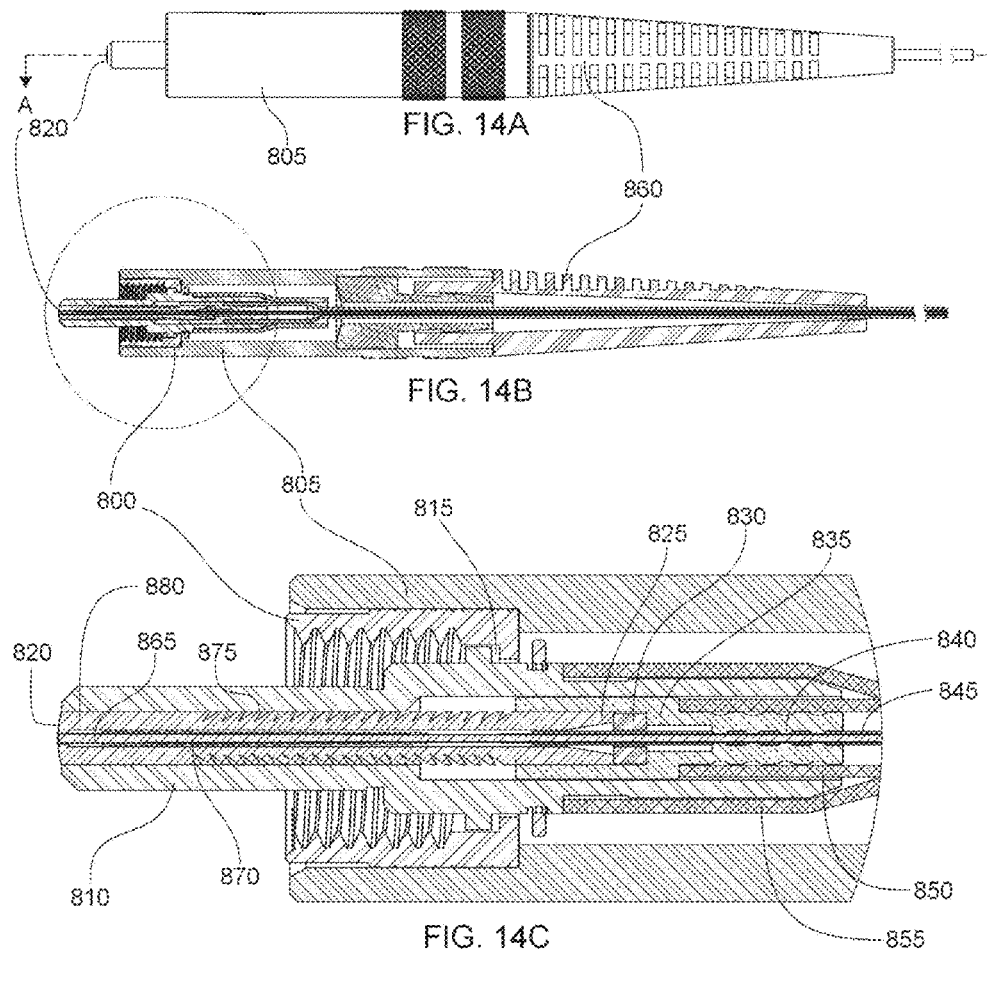
FIG. 14A is another example of the herein described optical fiber termination.
FIG. 14B is a cross-section of FIG. 14A taken on line A-A.
FIG. 14C is an expanded view of the detail in FIG. 14B.

The embodiments provided herein disperse "rejected" overfill energy over an area greater than provided in the prior art. For example, in U.S. Pat. No. 6,282,349 overfill energy is absorbed by a brass crimp ferrule delivered by way of a transmissive quartz ferrule while fixing and centering the fiber within the termination through crimping about the ETFE buffer. This dual function of the crimp limits the maximum spatial overfill of approximately 2.5 W, above which the ETFE buffer melts and failure ensues. Herein, the rejected energy is dispersed over a far larger area, where that area, and the area where thermally labile materials reside, is bisected by a SMA nut attachment point through which heat is communicated to the external heat sink (or "expansion nut"; FIG. 14, reference no. 800). Accordingly, the fiber termination can use softer and/or more labile materials for affixing the fiber within the termination and for reducing the stresses imparted upon the fiber at proximal connector fixation point. For example, adhesives and seals made of the following can be employed herein: graphite, Vespel, silicones, UV cure adhesives, and/or cyanoacrylates.

Turning to FIG. 14, the fiber optic termination can include, in addition to the optical fiber and the ferrule, a plurality of mechanical parts directed toward holding the termination and connecting the termination to a laser source. In one example, FIG. 14A depicts the external surfaces of a complete fiber optic termination; therein the termination can include a bend limiting boot 860 connected to a heat-dissipating expansion nut 805, with a protruding input face 820. FIG. 14B shows the internal components of a cross-section of FIG. 14A. Therein, the termination can include a SMA nut 800 that is pressed into the expansion nut 805 and the bend limiting boot 860. FIG. 14C depicts further details of the termination.

In this embodiment, the device, preferably, includes a mode discriminating input face 820, for example including a compound concave and convex curvature (e.g., shown in FIGS. 12 and 13). The input face 820 is carried on the terminus of a tapered fiber 865 and a quartz ferrule 880. In the depicted example, the clad fiber is a tapered fiber 865 carrying a silica coil 870 which is fused to the clad fiber surface. The clad fiber 865 and silica coil 870 are within a quartz ferrule 880. Preferably, the quartz ferrule 880 includes a TIR groove 875 or helix. The TIR groove 875 redirects undesirable energy in the quartz ferrule 880 to the SMA ferrule 810. Notably, redirected undesirable energy is absorbed by and heats the SMA ferrule 810, which resides within the laser port affixed to the larger laser cabinetry. The quartz ferrule 880 seats 825 onto a gasket 830 (e.g. a silicone gasket) within a crimp ferrule 835. The crimp ferrule 835 is crimped 840 onto the buffer layers 845 on the optical fiber. The crimp preferably provides a vacuum tight seal by compression of the gasket 830 between the crimp ferrule 835 and the quartz ferrule seat 825 as well as by physically pressing into the optical fiber buffer layers 845. The vacuum seal is further improved by a first tube 850 heat-shrunk about the crimp ferrule 835, and a second tube 855 heat-shrunk about a portion of the SMA ferrule 810 that holds the crimp ferrule 835. Furthermore, the SMA ferrule 810 is positioned within the SMA nut 800. The ferrule 810 and nut 800 are separated by a gap 815 which closes or disappears when the SMA is engaged within the laser port.

Preferably, the energy absorbing portions of the termination (e.g., the SMA ferrule 810) are separated from the thermally labile portions (e.g., the buffer layers 845 and the gasket 830) of the termination by a conduit for conducting the heat outside of the assembly. In FIG. 14C, the conduit for conducting the heat is from the input face 820, through the TIR groves 875 into the SMA ferrule 810. The heated SMA ferrule 810, preferably, conducts heat to the SMA nut 800 and not to the crimp ferrule 835.

The maximum laser power available to launch into small core fibers for surgery is typically in excess of the needs of the surgical procedure and/or the safe carrying capacity of the fiber (particularly when considerable deflection is required to reach the surgical target). The surgical need is, in part, a function of the perceived risk/reward of surgical safety versus surgical efficacy. Notably, one expects that the additional power, or power in higher repetition rates (favoring new "stone dusting" techniques), would be useful if such power can be delivered safely and reproducibly to a surgical target.

Commercially available small core fibers "waste-off" as much as 15% of the applied laser power within the termination and it is often the heat dissipation capacity (maximum 2.5 W) of the termination that effectively limits the maximum power rating, not the carrying capacity of the bulk fiber. Conversely, small core fibers carrying average powers that are well under the manufacturers' maximum power recommendations commonly fail within the deflected ureteroscope working channel due to predisposition to burn through failure though carrying large populations of higher order modes and/or cladding modes. (Burn through failures within deflections that are 50% larger than the smallest deflection capacity of flexible ureteroscopes are common with as little as 0.2 joules per pulse at 5 Hz.)

Prior art cannot address the selective coupling of only those laser focal spot modes that are (a) most effective in achieving the surgical goal and are (b) most compatible with passage of tortuous paths in reaching the surgical target. Although larger core fibers are not typically tasked with negotiating tight turns in advancing to the surgical target, these fibers do inadvertently suffer tight turns, not solely at the laser connector (for which most manufacturers supply some strain relief or bend limiter for mitigation of the risk) but at the sealing cap at the cystoscope working channel entrance and where the surgeon attempts to retain purchase upon the fiber for control, where bend limiters cannot be placed. Some surgical fibers come equipped with torque control devices (e.g., pin vises) that attach to a fiber by way of localized compression of the ETFE, e.g. side fire fibers for BPH, but such devices have not won acceptance in laser lithotripsy because the compression of the fiber by the pin vise often leads to burn through failure at or in close proximity to the torque controller.

The present invention has been described with reference to the preferred embodiments provided above; those skilled in the art will recognize that changes may be made in the form and detail without departing from the spirit and scope of the invention.

What is claimed:

1. An fiber termination comprising:
    an optical fiber having a terminus, adjacent to the terminus a clad fiber and distal from the terminus and adjacent to the clad fiber a polymeric-coated fiber,
        the clad fiber including a silica core and an F-doped silica cladding,
        the polymeric-coated fiber including the clad fiber carrying one or more polymeric coatings; and
    a mode stripper fused to the clad fiber, the mode stripper including at least one silica spring and/or silica tube, the silica tube carrying at least one furrow, the furrow or furrows covering all 360 radial positions about the silica tube;
    wherein the silica spring and/or silica tube and the clad fiber have refractive indices that are approximately equal.

2. The fiber termination of claim 1, wherein the mode stripper includes a silica tube having a helical furrow; the helical furrow having a leading edge selected from the group consisting of an edge perpendicular to a fiber longitudinal axis, an edge angled relative to the fiber longitudinal axis, and a mixture thereof.

3. The fiber termination of claim 2, wherein the mode stripper includes a silica tube having a helical furrow that has a leading edge that transitions from an edge perpendicular to a fiber longitudinal axis to an edge angled relative to the fiber longitudinal axis.

4. The fiber termination of claim 2, wherein the leading edge is angled at about 38° relative to the fiber longitudinal axis.

5. The fiber termination of claim 1, wherein the mode stripper is a silica spring.

6. The fiber termination of claim 5, wherein the silica spring is fused to the clad fiber such that the clad fiber is exposed within the spring pitch.

7. The fiber termination of claim 1 further comprising a silica ferrule fused over the mode stripper.

8. The fiber termination of claim 7, wherein the silica ferrule is fused to the clad fiber proximal to the terminus.

9. The fiber termination of claim 7, wherein the silica ferrule carries at least one furrow; the furrow or furrows covering all 360 radial positions about the silica ferrule.

10. The fiber termination of claim 9, wherein the silica ferrule has a helical furrow which has a leading edge selected from the group consisting of an edge perpendicular to a fiber longitudinal axis, an edge angled relative to the fiber longitudinal axis, and a mixture thereof.

11. The fiber termination of claim 7, wherein the silica ferrule is fused over a mode stripper that includes a silica tube having a helical furrow which has a leading edge that transitions from an edge perpendicular to a fiber longitudinal axis to an edge angled relative to the fiber longitudinal axis; and wherein the silica ferrule has a helical furrow which has a leading edge selected from the group consisting of an edge perpendicular to a fiber longitudinal axis, an edge angled relative to the fiber longitudinal axis, and a mixture thereof.

12. The fiber termination of claim 7, wherein the terminus includes a convex or conical lens on the silica ferrule.

13. The fiber termination of claim 1, wherein the terminus includes a concave lens that covers at least 90% of the silica core.

14. The fiber termination of claim 13, wherein the terminus further includes a convex or conical lens on the silica ferrule.

15. The fiber termination of claim 1, wherein the clad fiber, between the terminus and the polymeric-coated fiber, is a tapered clad fiber.

16. The fiber termination of claim 15, wherein the mode stripped is fused to the tapered clad fiber; further comprising a silica ferrule fused to the clad fiber proximal to the terminus; wherein the silica ferrule is not fused to the mode stripper.

17. The fiber termination of claim 15 further including an internal vacancy between the mode stripper and the silica ferrule.

18. A method of manufacturing an optical fiber termination comprising:
    providing an optical fiber that includes a denuded portion adjacent to a terminus;
    forming a mode stripper about the denuded portion of the optical fiber by either (A) positioning a silica tube about a length of the denuded optical fiber; fusing the silica tube to the denuded optical fiber; and then forming furrows in the silica tube; or (B) positioning a silica spring about a length of the denuded optical fiber; and then fusing the silica spring to the denuded optical fiber;
    positioning the mode stripper within a silica ferrule; and then
    sealing the silica ferrule to the optical fiber.

19. A method of manufacturing an optical fiber termination comprising:
    fusing a silica tube to a terminus of a clad fiber; and
    forming one or more furrows in an exterior surface of the silica tube.

20. The method of claim 19 further comprising providing a mode stripper having one or more furrows between the clad fiber and an interior surface of the silica tube; wherein the mode stripper is fused to the clad fiber.

* * * * *